Figure 1:
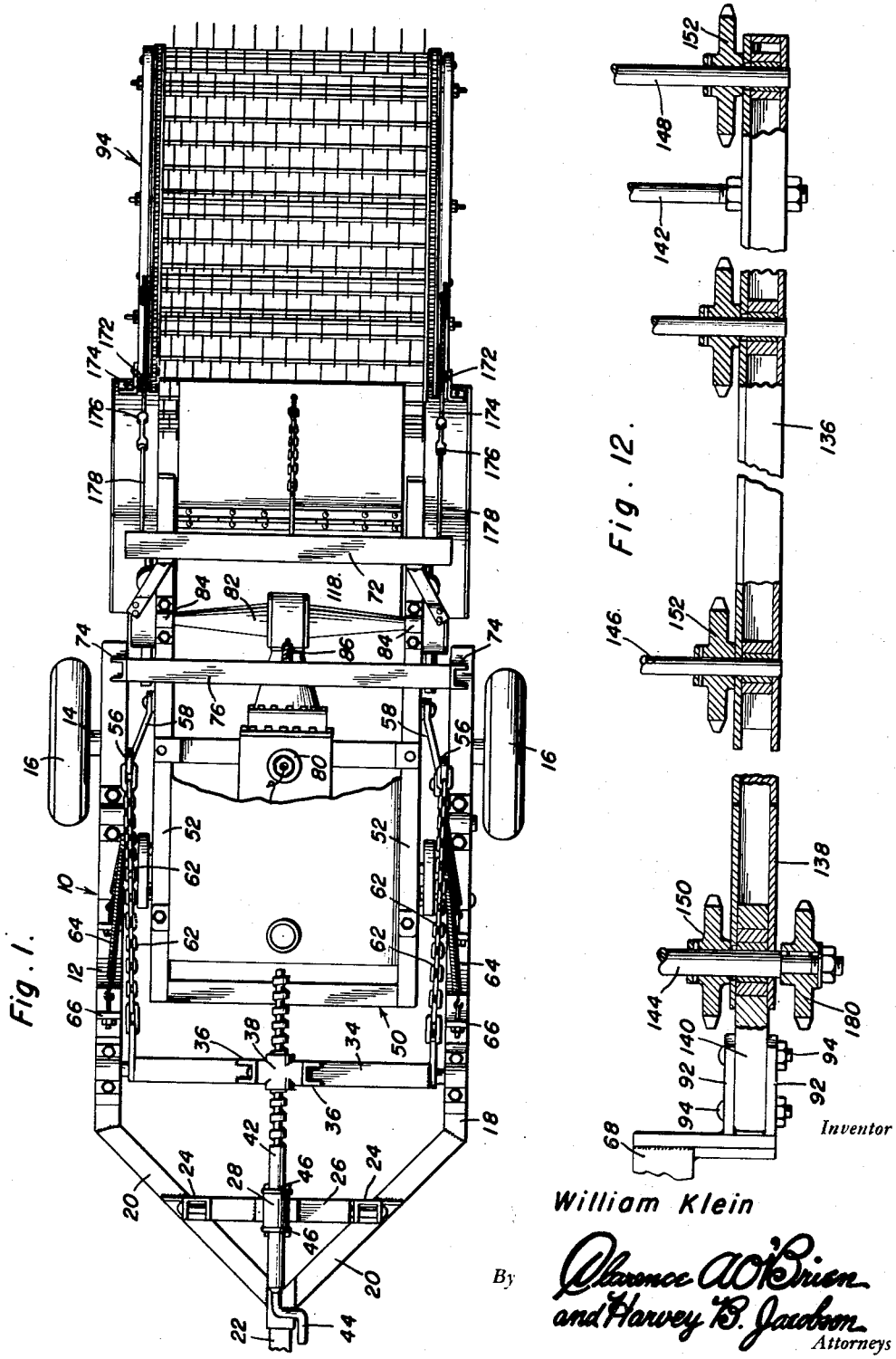

Nov. 9, 1954 W. KLEIN 2,693,746
APPARATUS FOR PREPARING SOIL FOR PLANTING
Filed Feb. 28, 1949 6 Sheets-Sheet 3

Inventor
William Klein

By Clarence A. O'Brien
and Harvey B. Jacobson
Attorneys

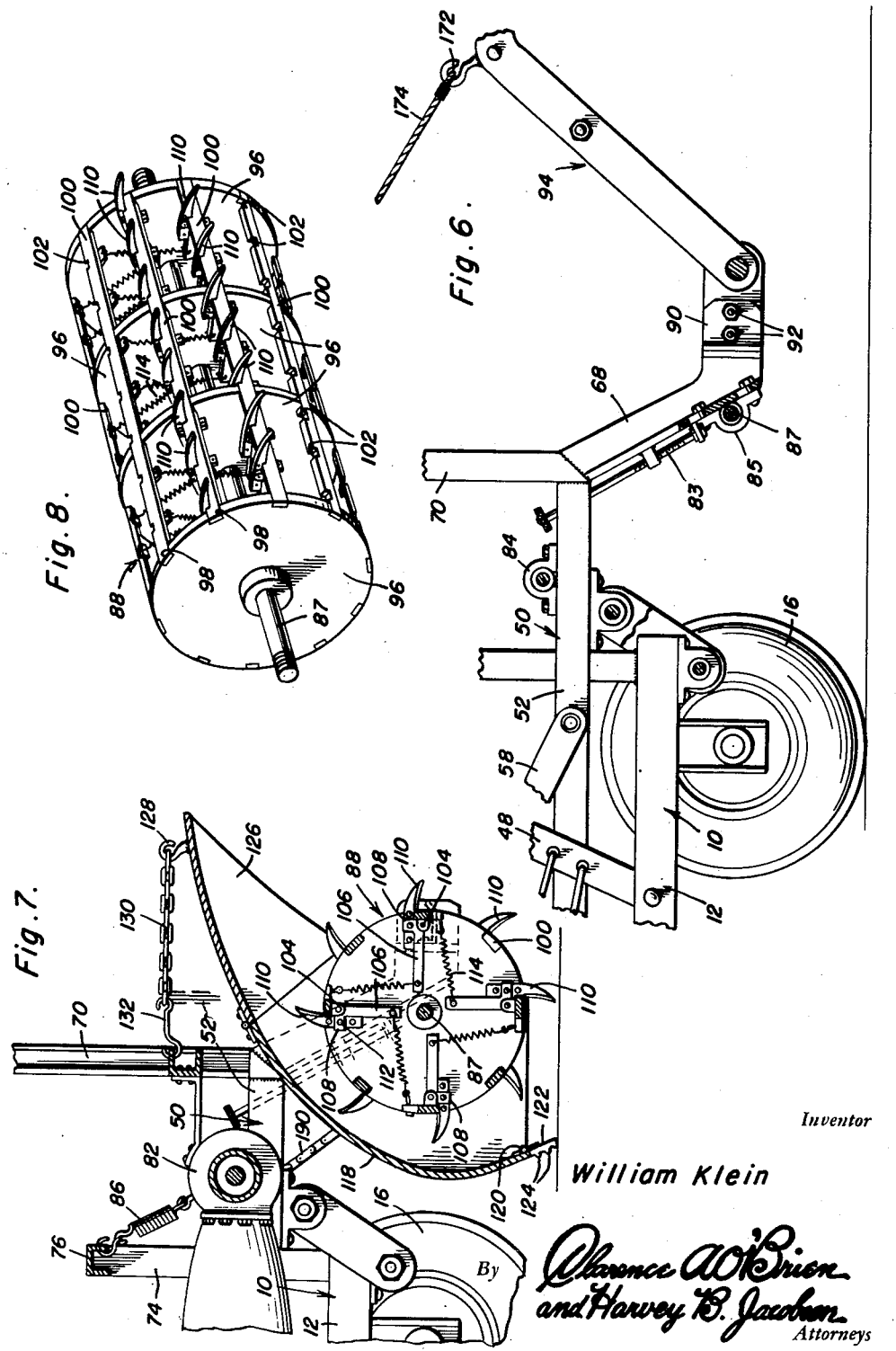

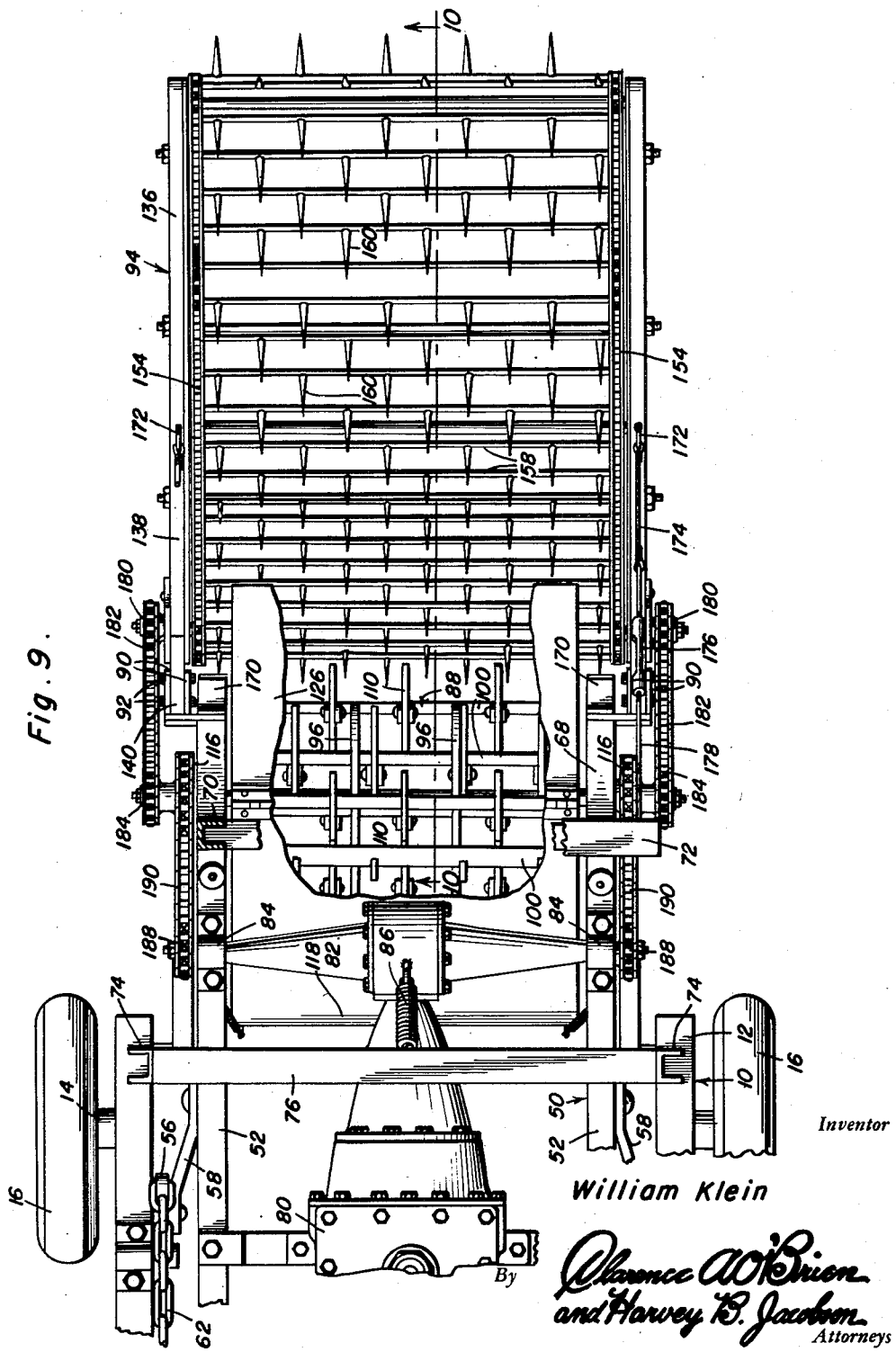

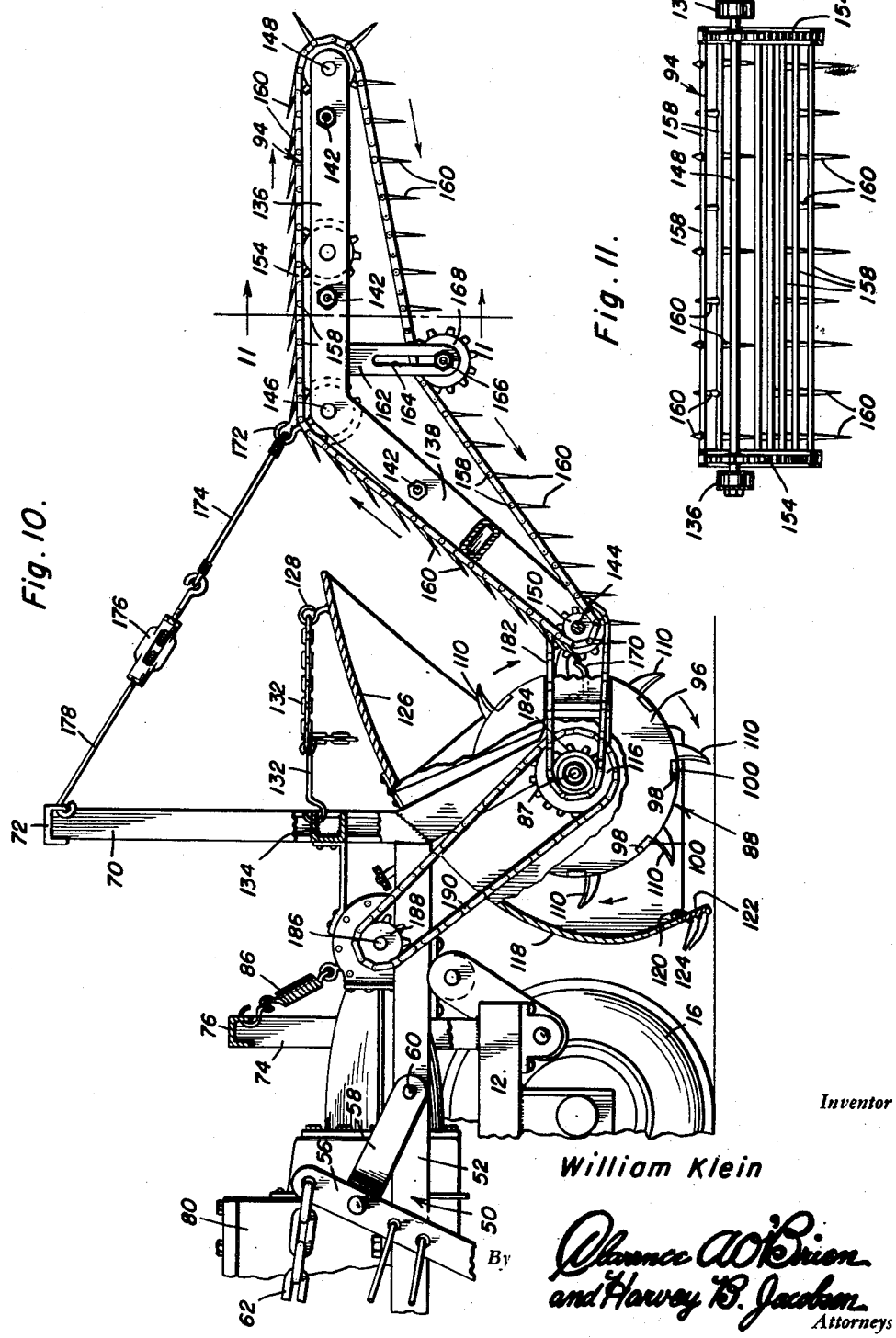

United States Patent Office 2,693,746
Patented Nov. 9, 1954

2,693,746

APPARATUS FOR PREPARING SOIL FOR PLANTING

William Klein, Warroad, Minn.

Application February 28, 1949, Serial No. 78,796

5 Claims. (Cl. 97—10)

This invention relates to an apparatus for preparing soil for planting.

Heretofore in the preparation of soil for planting it has been customary to first plow the field or bed to be planted, and then to harrow it, with the result that any trash or organic matter such as vegetable stalks and the like were mixed into the soil before having been rotted or otherwise properly prepared as a fertilizer. As a consequence, not only were the stalks turned under, but the root systems were left substantially intact. Also grubs and the like of crop destroying insects were left in the soil to thrive and subsequently develop.

The primary object of this invention is to separate the soil from the trash and organic matter, and to deposit the trash and organic matter in the form of a mulch on the freshly prepared soil, so that root systems, stalks and like organic matter will be exposed to the elements in order to effect proper rotting and conversion into fertilizer while retaining the moisture in the soil.

A still further object is to expose the grubs, and eggs of crop destroying insects to the elements, thereby to effect a destruction thereof.

A further and more specific object of the invention is to preserve the nitrogen content of the soil, and at the same time divide the soil into lumps and prepare a bed of such lumps suitable for planting.

The above and other objects may be attained by employing this invention which embodies among its features a soil tiller coupled to a farm tractor to be towed thereby, a power driven soil and trash separator coupled to the soil tiller and operable immediately therebehind to separate soil loosened by the tiller from trash intermingled therewith and means carried between the tractor and the soil tiller for driving the tiller and the separator.

Other features include means coupled to the tiller and operable from a station adjacent the position of the operator of the tractor to raise or lower the tiller as the device progresses under the power of the tractor.

Still other features include a wheeled trailing vehicle coupled to a farm tractor for advance therewith, a subframe mounted on the vehicle to move upwardly and downwardly, a soil tiller carried by the sub-frame immediately behind the vehicle, and a soil and trash separator carried by the sub-frame immediately behind the tiller and upon which soil lifted by the tiller is deposited and carried upwardly and rearwardly immediately behind the tiller.

Still other features include loosening soil and intermingled trash and organic matter from a bed of soil, lifting said soil together with the intermingled trash and organic matter, moving the lifted soil and the intermingled trash and organic matter in a substantially horizontal path, while so moving the soil and the intermingled trash and organic matter separating the soil from the trash and intermingled organic matter, and depositing the separated soil on the surface from which it was loosened, and subsequently depositing the trash and organic matter as a layer on the soil from which it was separated to form a mulch.

Figure 2:
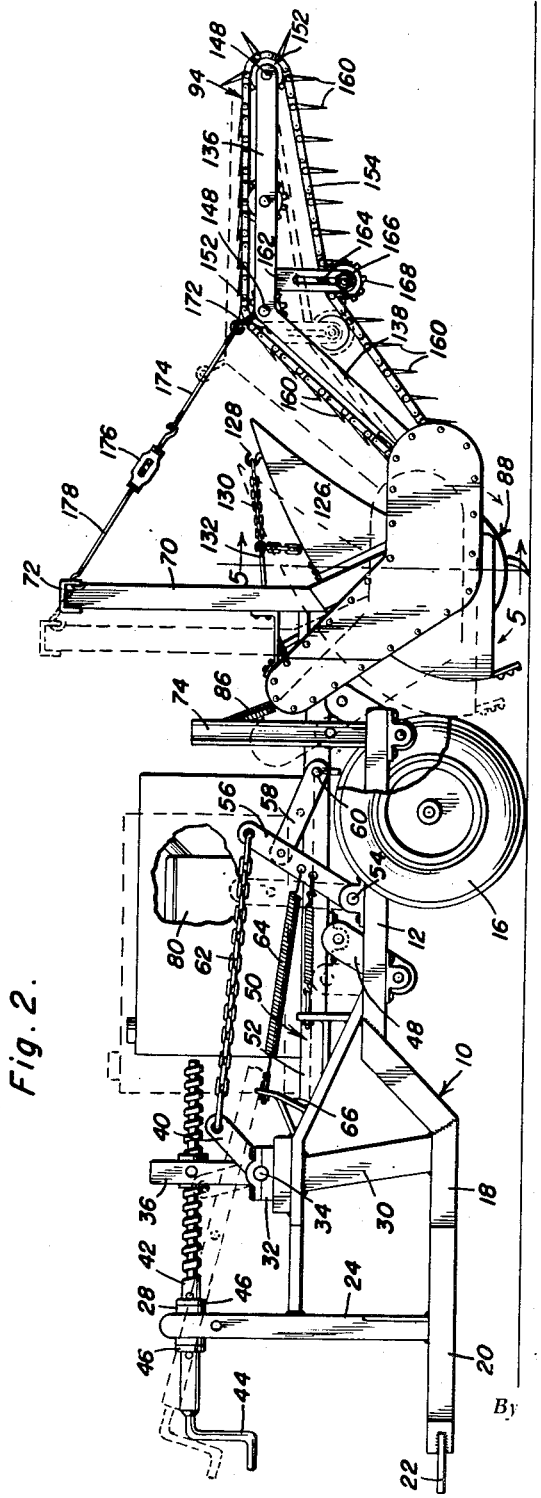
Figure 3:
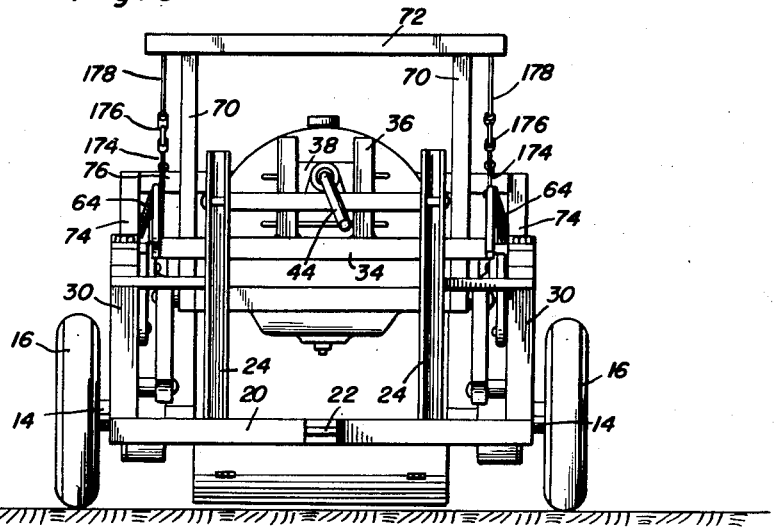
Figure 4:
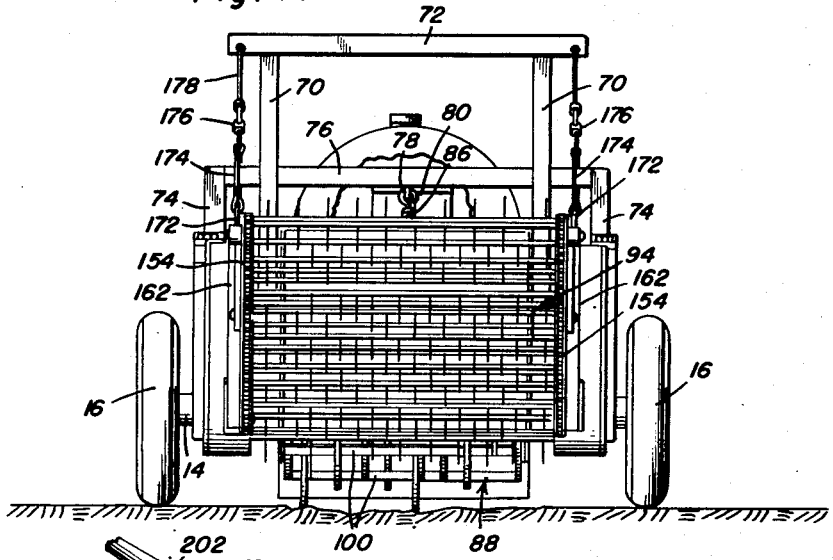
Figure 14:
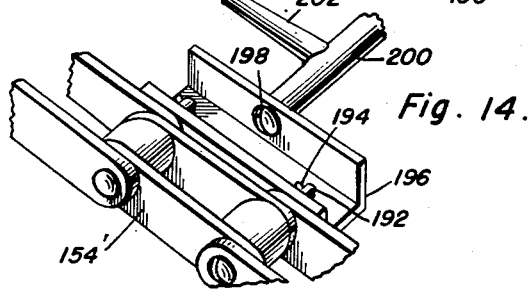

In the drawings:

Figure 1 is a top plan view of an apparatus for preparing soil for planting embodying the features of this invention, Figure 2 is a side view of the apparatus illustrated in Figure 1, Figure 3 is a front view in elevation of the apparatus illustrated in Figure 1, Figure 4 is a rear view in elevation of the apparatus illustrated in Figure 1, Figure 5 is a fragmentary enlarged sectional view taken substantially along the line 5—5 of Figure 2, Figure 6 is an enlarged fragmentary sectional view through the apparatus illustrated in Figure 1 showing parts of the supporting frame in detail, Figure 7 is a fragmentary longitudinal sectional view through a portion of the tiller, Figure 8 is a perspective view of the rotary tiller, Figure 9 is a fragmentary plan view of the rear end of the apparatus showing the earth separator in detail, certain parts of the apparatus being broken away more clearly to illustrate certain details of construction, Figure 10 is a longitudinal sectional view taken substantially along the line 10—10 of Figure 9, Figure 11 is a transverse sectional view taken substantially along the line 11—11 of Figure 10, Figure 12 is a fragmentary enlarged plan view of the frame of the separator, showing portions of the frame broken away more clearly to illustrate certain details of construction, Figure 13 is an enlarged fragmentary perspective view of a portion of the separator apron, and Figure 14 is a view similar to Figure 13 illustrating a modified form of construction of the separator apron.

Referring to the drawings in detail, this improved soil preparing apparatus comprises in general a wheeled vehicle designated generally 10 comprising a frame 12 carrying adjacent its rear end an axle 14 on which a pair of ground wheels 16 are rotatably mounted. The forward end of the frame 12 is downwardly offset as at 18 and the forward ends of the side bars of the downwardly offset portion of the frame 12 converge as at 20 to form a draft tongue, the forward end of which is fitted with a conventional clevis 22 for coupling to a conventional farm tractor. Extending vertically from the frame 12 intermediate the ends of the converging extensions 20 are columns 24 supporting adjacent their upper ends a cross member 26 which is mounted to rock about a horizontal axis which extends transversely of the frame, and carried on the cross member midway between opposite ends thereof is a sleeve 28 the axis of which lies parallel to the longitudinal axis of the frame 12. Supported on the frame 12 between the rear ends of the convergent members 20 and the ground wheels 16 are spaced upwardly extending columns 30, the upper ends of which carry aligned journal bearings 32 in which a rock shaft 34 is mounted to rock about a horizontal axis which lies parallel with the axis of the rocking bar 26. Fixed to the rock shaft 34 substantially midway between opposite ends, are spaced columns 36, and rockably supported between the columns 36 adjacent their upper ends is a nut 38 which aligns axially with the sleeve 28 previously referred to. Welded or otherwise fixed to the rock shaft 34 adjacent opposite ends thereof are upwardly and rearwardly extending arms 40, and threaded through the nut 38, and extending axially through the sleeve 28 is a screw 42 carrying at its forward end, above the convergent ends of the converging extensions 20 a crank 44. Fixed to the threaded bar 42 at opposite ends of the sleeve 28 are stop collars 46 which serve to restrain longitudinal movement of the threaded bar 42 with relation to the sleeve 28 and yet will permit the threaded bar to rotate within said sleeve. It will thus be seen that as the hand crank 44 is rotated, the rock shaft 34 will rock in its bearings 32.

Rockably supported on the frame 12 between the dropped portion 18 and the ground wheels 16 are upwardly extending links 48 which move in arcs adjacent opposite sides of the frame 12, and pivotally coupled to the upper ends of the links 48 is a sub-frame designated generally 50 having side bars 52 which extend longitudinally of the frame 12 adjacent the side bars thereof and to the rear of the dropped portion 18. Pivotally coupled as at 54 to the side bars of the frame 12 between the links 48 and the ground wheels 16 are lift arms 56 to which are pivoted intermediate their ends lift links 58 which are coupled as at 60 to the side bars 52 of the frame 50 so that as the lift arms 56 are moved about their pivots 54 the frame 50 will be raised or lowered.

Connected to the lift arms 56 adjacent their upper ends are lift chains 62 which, in turn, are connected to the lift arms 40 so that when the hand crank 44 is rotated, the sub-frame 50 will be raised or lowered according to the direction of rotation of the hand crank. Suitable counter-balanced springs 64 are coupled to the lift arms 56, and to suitable brackets 66 carried by the frame 12 so as to exert yielding pull on the lift arms 56 in a direction to elevate the frame 50. Extending downwardly and rearwardly from the rear ends of the side bars 52 of the frame 50 are supporting arms 68 upon which the rotary tiller is rotatably supported as will be more fully hereinafter described. Vertical columns 70 project upwardly from the side bars 52 at their junctions with the downwardly extending arms 68, and supported on the upper ends of the columns 70 is a cross member 72 the purpose of which will be more fully hereinafter described. Similar vertical columns 74 extend upwardly from the rear ends of the side members of the frame 12 and carry at their upper ends a cross member 76 carrying intermediate its ends an eye 78, the purpose of which will be more fully hereinafter explained.

Supported on the sub-frame 50 is a suitable prime mover 80 which is provided with a conventional transmission housed within a housing 82 which is mounted at opposite ends in suitable supports 84 carried by the side bars 52 of the sub-frame adjacent the rear end thereof. Coupled at one end to the housing 82 intermediate the ends thereof is a retractile coil spring 86, the opposite end of which is coupled to the eye 78 so as to assist the counterbalance springs 64 to lift the sub-frame 50 relative to the main frame 12. It will thus be seen that despite the weight of the prime mover and the balance of the mechanism employed, the frame 50 may be easily adjusted in height relative to the frame 12.

Mounted for longitudinal adjustment adjacent the lower end of each supporting arm 68 by means of an adjusting screw 83 is a supporting bracket 85 for rotatably supporting the axle shaft 87 of my improved rotary tiller designated generally 88, and projecting rearwardly from the rear ends of opposite depending arms, are substantially horizontally extending spaced parallel ears 90 which are pierced to receive attaching bolts 92 by means of which the soil and trash separator designated generally 94 is detachably coupled to the device.

The tiller 88 above referred to comprises a group of disks 96 fixed at longitudinally spaced points to the shaft 87, and these disks are provided with peripherally spaced notches 98 in which are seated longitudinally extending digger tooth supporting and reinforcing bars 100. Each bar 100 is provided in one side edge with longitudinally spaced notches 102, and fixed to each bar 100 adjacent each notch 102 is an inwardly extending bracket 104 in which is pivotally supported a rock arm 106 which projects toward the shaft 87 and carries adjacent its pivoted end a laterally extending loop or socket 108 the opening in which aligns with a notch 102 and receives a digger tooth 110 which projects outwardly beyond the peripheries of the disks as will be readily understood upon reference to the drawings. These disks are adjustably held in the sockets 108 by suitable cross pins 112, so that the distance that they project beyond the peripheries of the disks 96 may be regulated. A retractile coil spring 114 is coupled to each rocker arm 106 adjacent the inner end thereof, and to a bracket 104 remote from the bracket to which the arm is pivoted so as to yieldingly hold the teeth outwardly, and in an adjacent notch 102. This arrangement protects the teeth against breakage in event that a hard object such as a stone is encountered by the tiller, and at the same time prevents the teeth from shifting laterally during the tilling operation. As previously explained the shaft 87 is journaled in the bearing brackets 85, and fixed to each end of the shaft is a drive sprocket 116 by which the shaft 87 and the tiller 88 are driven.

Fixed to the frame 50 between the rotary tiller 88 and the ground wheel 16 of the vehicle 10 is a curved shield 118 which extends transversely of the apparatus, and pivotally supported at 120 to the lower edge of the shield is a flap 122 carrying forwardly projecting knobs 124 which serve to break up organic matter such as stalks when they are encountered by the teeth 100 of the rotary tiller 88. A hood 126 is pivoted to the upper edge of the shield 118 and projects upwardly and rearwardly in order to guide the soil lifted by the teeth 110 onto the separator to be more fully hereinafter described. A suitable eye 128 is fixed to the hood 126 remote from its pivotal point, and coupled to the eye is an adjusting chain 130, the links of which are adjustably connected to a hook 132 which is carried by a cross bar 134 which extends transversely between the columns 70. It will thus be seen that the hood 126 may be raised or lowered about its pivotal connection with the shield 118 in accordance with the requirements.

The soil and trash separator 94 previously referred to comprises a pair of spaced side bars 136 which extend substantially horizontally and are provided adjacent their forward ends with downwardly inclined arms 138, the lower ends of which are provided with horizontal extensions 140 which are received between the ears 90 (Figure 9) and secured in place by the bolts 92. The side bars 136 and the extensions 138 are held in spaced parallel relation by cross bars 142, and journaled in the downward extensions 138 adjacent their lower ends is a drive shaft 144. An idler shaft is journaled in the side bars 136 adjacent their junctions with the downward extensions 138, and a similar idler shaft 148 is journaled in the horizontal side bars 136 adjacent their rear ends. Fixed to the drive shaft 44 adjacent each end is a sprocket 150 which runs just inside of an adjacent extension 138, and a similar sprocket 152 is carried by each idler shaft 146 and 148. Running over the sprockets 150 and 152 adjacent opposite side rails 36 are endless roller chains 154, certain pins 156 of which (Figure 13) are elongated so as to project inwardly and form pivot bearings for cross rods 158 which extend transversely of the machine between the chains 154, and carried by the cross bars 158 are longitudinally spaced teeth 160 which extend radially from their respective cross bars and are of a length greater than the distance between the cross bars so that they will cooperate with the cross bars in forming a foraminous conveyor apron during the travel of the chains 154 upwardly and horizontally. A suitable depending bracket extends downwardly from each side bar 136 adjacent the bearing for the forward shaft 146, and each such bracket is provided with a longitudinal elongated slot 164 in which a suitable stub shaft 166 is supported for vertical adjustment. A chain tightening sprocket 168 is supported on each stub shaft 166 and engages the lower runs of adjacent chains 154 as will be readily understood upon reference to Figure 10. In order to assure the moving of the fingers 160 downwardly and into engagement with an adjacent rod 158 a suitable guard 170 is fixed to the rear end of each arm 68 to engage the endmost teeth 160 of a bar 158 which fails to swing about its pivots 156. It will thus be seen that a foraminous conveyor apron is positively formed as the chains 154 move upwardly and horizontally. In order to suspend the separator 94 in proper position behind the tiller, and to relieve the bolts 92 from shearing stresses, an eye 172 is fixed to each side bar 136 adjacent its junction with its respective downward extension or arm 138, and coupled to each eye 172 is one end of a flexible cable 174, the opposite end of which is coupled to a turnbuckle 176 which, in turn, is coupled through the medium of a suitable link 178 to the cross member 72 at the upper ends of the columns 70. A suitable drive sprocket 180 is fixed to each end of the drive shaft 150, and each drive sprocket has driving connection through the medium of a conventional endless chain 182 with a driving sprocket 184 carried adjacent the outer end of the shaft 87. It will thus be seen that when the shaft 87 is rotated, the foraminous apron of the separator 94 will be moved.

Fixed to each end of a drive shaft 186 carried within the housing 82 is a drive sprocket 188 which has driving connection through the medium of an endless chain 190 with one of the sprockets 116 on the shaft 87, so that when the prime mover 80 is set into operation, the power generated thereby will be transmitted through the power transmission shaft 186 and chains 190 to the shaft 87 of the rotary tiller 88.

In some instances I may find it desirable to employ a modified form of chain for carrying the cross bars of the separator 94 in which event I employ a chain designated 154' of the conventional roller chain type but in which the pins connecting the links are extended as at 192 (Figure 14). These pins 192 are provided with transverse openings adjacent their inner ends and extending through said openings are cotter pins 194 by means of which channels 196 are detachably coupled to the links. Each channel 196 is of a length substantially equal to a single length of a chain link and is provided intermediate its ends with an opening 198 for the reception of an end of a rocking bar 200 carrying longitudinally spaced radially extending tines or fingers 202 which are of a length to cooperate with an adjacent bar 200 in forming a foraminous apron similar to that previously described.

In use the soil tiller is coupled through the medium of the device 22 to a conventional farm tractor behind which the apparatus trails. With the prime mover 80 set into operation, it will be evident that the rotary tiller 88 can be lowered by turning the hand crank 44 and moving the sub-frame to the desired position, so that the depth to which the teeth 110 enter the ground may be regulated. As the tractor progresses, it will be obvious that the earth encountered by the teeth 110 will be loosened and lifted by the teeth and deposited on the apron of the separator 94. Of course, any trash lying on the surface being treated will also be lifted by the teeth and deposited on the separator with the result that any leaves, stalks, or other matter will be carried rearwardly along the separator while the soil with which the trash was intermingled will sift through the foraminous apron formed by the fingers 160 and rods 158 onto the ground from which it has just been lifted. The trash and organic matter which was intermingled with the soil at the time of its deposit on the apron of the separator 94 will be carried rearwardly and deposited from the rear end of the separator on top of the prepared soil to form a mulch. In thus lifting the organic matter and depositing it on the surface, it will be evident that it will be exposed to the action of the elements so that root systems, leaves, and the like will be subjected to disintegrating treatment. Likewise, any larva or grubs infesting the soil will be deposited on or near the surface where they will be subject to destruction. It will be evident that as the fingers 150 reach the rear end of the horizontal run of the apron, they will fall by gravity into a substantially vertical position as illustrated in the drawings, and the rapidity with which they fall will serve to aid in the discharge of the trash from the apron of the separator 94.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In apparatus for preparing soil for planting, a trailing vehicle detachably coupled to a farm tractor, a sub-frame mounted on said trailing vehicle to move in a vertical arc which extends longitudinally of the trailing vehicle, a soil tiller carried by said sub-frame adjacent the rear end of the trailing vehicle, a power driven soil and trash separator carried by the sub-frame immediately behind the soil tiller to separate soil loosened by the tiller from trash intermingled therewith and means on the sub-frame for driving said tiller and said separator, and means carried by the trailing vehicle and coupled to the sub-frame to raise and lower said sub-frame, said means being operable from a station adjacent the operator of the tractor and comprising a pair of lift arms on said vehicle connected to opposite sides of the sub-frame, a transverse rocker on said vehicle, pull connections between said rocker and said arms, a second rocker on said vehicle, and a screw feed shaft journaled in said second rocker, operatively connected through said second rocker to said first rocker.

2. In apparatus for preparing soil for planting of the type which includes a wheeled vehicle detachably coupled to a farm tractor, a sub-frame mounted on said vehicle for vertical adjustment and means carried by the vehicle and operable from a position adjacent the station occupied by the operator of the tractor to adjust said sub-frame, a tiller carried by the sub-frame for tilling the soil as the vehicle advances, said tiller comprising a plurality of spaced disks mounted on the sub-frame to rotate about a common horizontal axis immediately behind the vehicle, said horizontal axis lying perpendicular to the direction of travel of the vehicle, a group of radially extending diggers carried by each disk for loosening the soil beneath the disks, a soil and trash separator carried by the sub-frame immediately behind the tiller to separate the soil loosened by the tiller from trash intermingled therewith, and a prime mover mounted on the sub-frame and coupled to the tiller for rotating the disks about the common horizontal axis.

3. In apparatus for preparing soil for planting of the type which includes a wheeled vehicle detachably coupled to a farm tractor, a sub-frame mounted on said vehicle for vertical adjustment and means carried by the vehicle and operable from a position adjacent the station occupied by the operator of the tractor to adjust said sub-frame, a tiller carried by the vehicle for tilling the soil as the vehicle advances, said tiller comprising a plurality of spaced disks mounted on the sub-frame to rotate about a common horizontal axis immediately behind the vehicle, said horizontal axis lying perpendicular to the direction of travel of the vehicle, a group of radially extending diggers carried by each disk for loosening the soil beneath the disks, a driven soil and trash separator carried by the sub-frame immediately behind the tiller to separate the soil loosened by the tiller from trash intermingled therewith, a prime mover mounted on the sub-frame and coupled to the tiller for rotating the disks about the common horizontal axis, and means coupled to the disks and to the separator to drive said separator as the disks rotate.

4. In apparatus for preparing soil for planting, a trailing vehicle detachably coupled to a farm tractor, a sub-frame mounted on said trailing vehicle to move in a vertical arc which extends longitudinally of the trailing vehicle, a soil tiller carried by said sub-frame adjacent the rear end of the trailing vehicle, a power-driven soil and trash separator carried by the sub-frame immediately behind the soil tiller to separate soil loosened by the tiller from trash intermingled therewith, means on the sub-frame for driving said tiller and separator, and means carried by the trailing vehicle and coupled to the sub-frame to raise and lower said sub-frame comprising a pair of lift arms on said vehicle connected to opposite sides of the subframe, a transverse rocker on said vehicle, pull connections between said rocker and said arms, a second rocker on said vehicle, and a screw feed shaft journaled in said second rocker and operatively connected through said second rocker to said first rocker.

5. In apparatus for preparing soil for planting of the type which includes a wheeled vehicle detachably coupled to a farm tractor, a sub-frame mounted on said vehicle for vertical adjustment, means carried by the vehicle and operable to adjust said sub-frame, a tiller carried by the sub-frame for tilling the soil as the vehicle advances, said tiller comprising a plurality of spaced disks mounted on the sub-frame to rotate about a common horizontal axis immediately behind the vehicle, said horizontal axis lying perpendicular to the direction of travel of the vehicle, a group of radially extending diggers carried by said disks for loosening the soil beneath the disks, a soil and trash separator carried by the sub-frame immediately behind the tiller to separate the soil loosened by the tiller from trash intermingled therewith, and a prime mover mounted on the sub-frame and coupled to the tiller for rotating the disks about the common horizontal axis.

References Cited in the file of this patent

UNITED STATES PATENTS

| Number | Name | Date |
| --- | --- | --- |
| 1,226,515 | Hicks | May 15, 1917 |
| 1,239,599 | Hicks | Sept. 11, 1917 |
| 1,276,843 | Wentworth | Aug. 27, 1918 |
| 1,303,149 | August | May 6, 1919 |
| 1,303,150 | August | May 6, 1919 |
| 1,319,936 | Wentworth | Oct. 28, 1919 |
| 1,320,469 | Hicks | Nov. 4, 1919 |
| 1,579,406 | Skene | Apr. 6, 1926 |
| 1,611,917 | Johnson | Dec. 28, 1926 |
| 1,611,919 | Kilborn | Dec. 28, 1926 |
| 1,643,328 | Yackley | Sept. 27, 1927 |

(Other references on following page)

UNITED STATES PATENTS

| Number | Name | Date |
|---|---|---|
| 1,708,732 | McFarland | Apr. 9, 1929 |
| 1,751,887 | Rose | Mar. 25, 1930 |
| 1,786,388 | Beaudry | Dec. 23, 1930 |
| 1,850,357 | Pitcher | Mar. 22, 1932 |
| 1,906,127 | Reishus | Apr. 25, 1933 |
| 2,060,688 | Pryor et al. | Nov. 10, 1936 |
| 2,129,298 | Ariens | Sept. 6, 1938 |
| 2,143,648 | Coutchure | Jan. 10, 1939 |
| 2,424,520 | Tonkin | July 22, 1947 |
| 2,455,148 | Traver | Nov. 30, 1948 |
| 2,482,910 | Hittelsater | Sept. 27, 1949 |